Dec. 5, 1933.    F. WÖLFER    1,938,508

SWITCH GEAR INSTALLATION

Filed July 15, 1931    2 Sheets-Sheet 1

F. Wolfer INVENTOR

By: Marks & Clerk
ATTYS.

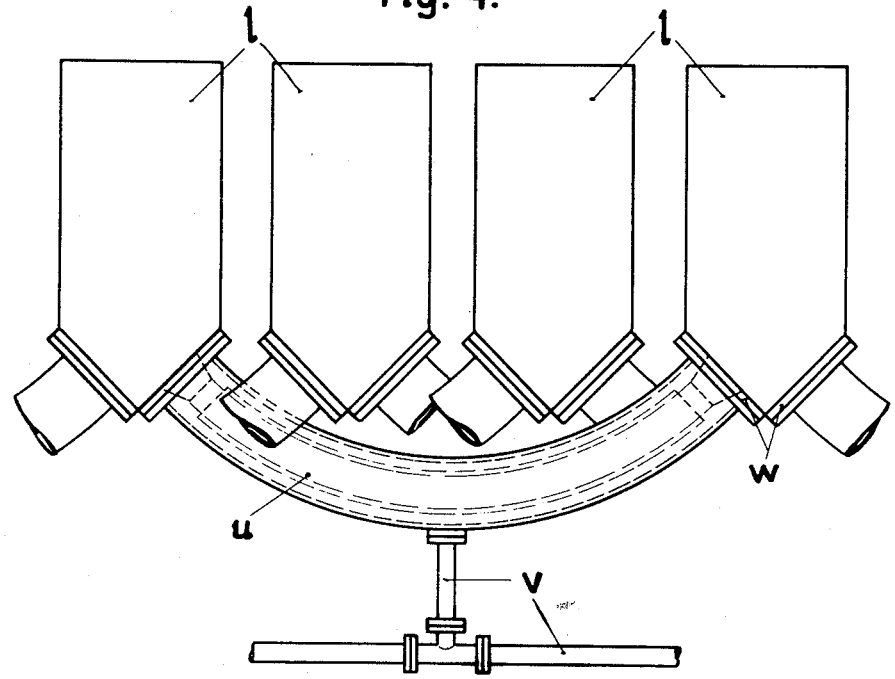
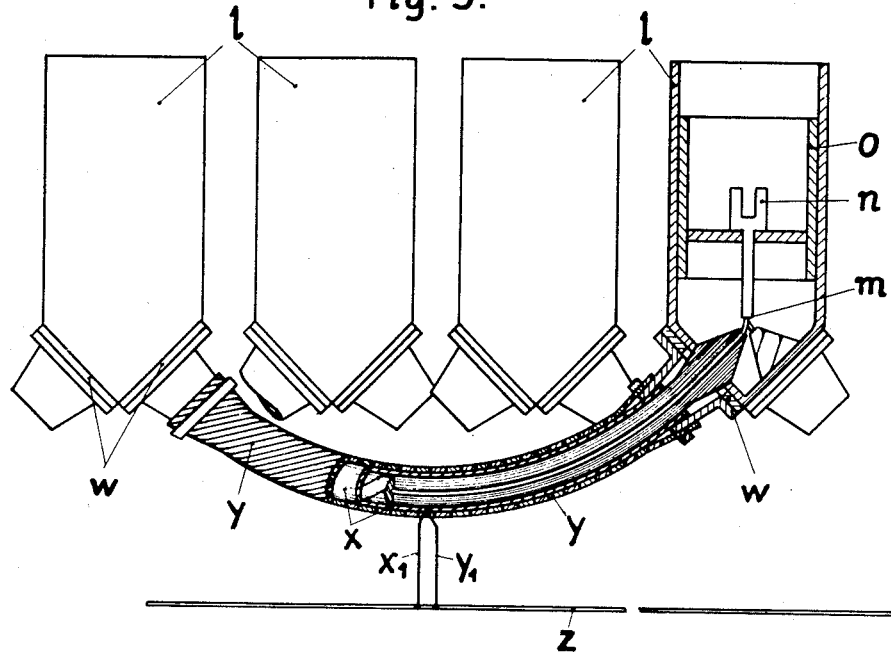

Patented Dec. 5, 1933

1,938,508

UNITED STATES PATENT OFFICE 1,938,508

SWITCH GEAR INSTALLATION

Franz Wölfer, Mulheim, Germany, assignor to Felten & Guilleaume Carlswerk Actiengesellschaft, Cologne-Mulheim, Germany Application July 15, 1931, Serial No. 550,979, and in Germany July 23, 1930

10 Claims. (Cl. 175—298)

In enclosed switchgear installations all the voltage-carrying parts are enclosed in earthed metallic casings and are very often surrounded by oil, compound or other insulating means. As a rule, power circuit-breakers are connected by means of plug-in contacts to the bus-bars and to the out-going distribution cables and they can be run out horizontally above and below. For each switching unit the bus-bars are subdivided into sections and are connected together in separate oil- or compound-filled connecting chambers.

According to the present invention, the bus-bars, instead of consisting, as hitherto, of conductors surrounded by earthed metallic casings, are constituted by cables. The arrangement of the cables in the form of bus-bars is effected, for instance, in such a manner that the bus-bars are composed of a plurality of sections of cables which are bent to U-shape and of which each one effects the electric connection from one switch unit to the next one, whereby the end of the one cable section and the beginning of the next following section have a common double cable end joint.

One form of construction according to the present invention is illustrated, by way of example, in the accompanying drawings, which show an enclosed switchgear installation with switchgear devices capable of being run out horizontally and wherein the bus-bars are constituted by single-core cables. It is to be understood that instead thereof, the bus-bars may consist of multi-core cables.

Figures 4 and 5 illustrate on an enlarged scale two different forms of construction of the bus-bars.

On the track pedestals $a$ there is mounted the power circuit-breaker $d$ which is provided with plug-in contacts $b$ and $c$ and which is adapted to be run along horizontally. The end joints $e$ of the distribution cable $f$ are secured to the track pedestals $a$ and connected to contacts $g$ which, when the power circuit-breaker is run in, engage with the contacts $b$ secured thereto.

According to the invention, the bus-bars consist of cables, the arrangement being such in the form of construction shown by way of example that a plurality of single-core sections of cable $h$, $i$ and $k$ constitute the bus-bar of one phase. The cable sections $h$, $i$ and $k$ are bent in a U-shape for the purpose of facilitating the arrangement. The end of the one cable section possesses in common with the beginning of the next following section, a double cable end joint. For instance the cable section $h$ terminates in the double cable end joint $l$, while the next following cable section $i$ begins at this point. Each cable section leads from the lower joint of the one double cable end joint to the upper joint of the corresponding double cable end joint of the next following switch field. The connecting pipes of the individual cable sections are arranged in an inclined position for the purpose of economizing in space and facilitating the installation. The cable conductors are conductively connected together within the double cable end joints $l$ by means of terminals $m$, which are connected to plug-in contacts $n$. Each plug-in contact $n$ is surrounded in a known manner by an insulating cylinder $o$ which is cemented in the metallic casing. The interior of the double cable end joints may be filled with an insulating material. The electric connection with the bus-bars is effected through the intermediary of three single-core cables $r$, $s$ and $t$. The unused lower or upper connections of the double cable end joints of the switch field provided at the end of the installation, are closed up by means of closing caps $p$. If, later on, it is desired to extend the installation by the connection of new switch fields, the closing caps $p$ are removed, when the cable sections of the new fields can easily be connected to the connecting pipes.

Figure 1:
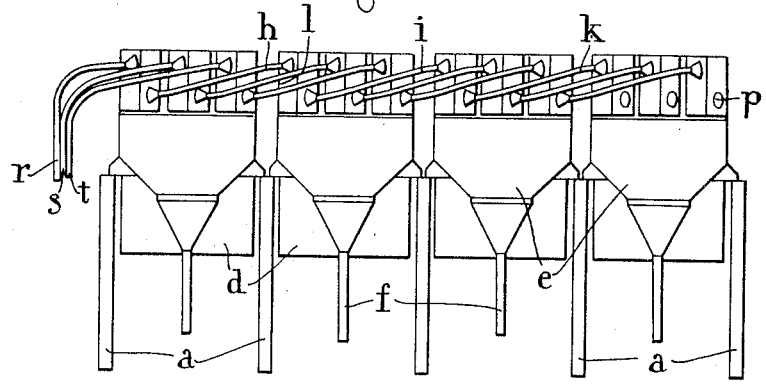
Figure 1 shows a rear view of an enclosed switchgear installation consisting of four fields.
Figure 2:
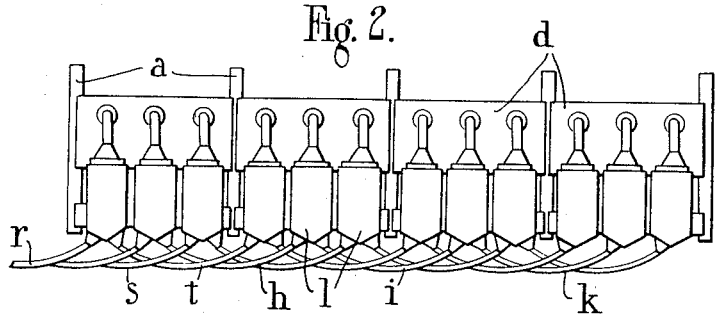
Figure 2 is a plan view.
Figure 3:
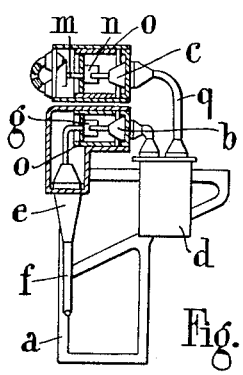
Figure 3 is a cross-section thereof.

As shown in Figure 3, besides the bus-bars also the connecting leads $q$ between the passage conduits of the circuit-breaker and the plug-in contacts may be constituted by cables. The plug-in contacts in this case may suitably be secured to a frame in such a manner that when the power circuit-breaker runs in, they can make good contact with the corresponding counter-contacts of the bus-bars and distribution cables. Similarly, the cable sections constituting the bus-bars and which are bent towards the back of the installation, may be secured in position. The installation may also be carried out in such a manner that the cable sections are not bent towards the rear of the installation but upwards or downwards. If cables are used to serve as bus-bars, the insulation of which is subjected to pressure, each cable section may be provided with a separate pressure pipe.

When the bus bars consist of cables, the insulation of which is under pressure, each cable section is surrounded by a pressure pipe $u$ and is connected to a main pressure pipe line through a separate pipe $v$, as can be seen from Fig. 4.

In order to keep the losses in the metal sheathing and armouring of the cables serving as bus bars as small as possible, the connecting pipes of the cables are insulated with respect to the end joint casings $l$ by means of insulating discs $w$, as can be seen in Fig. 5 and the cable sheathing $x$ as well as the cable armouring $y$ are conductively connected in the middle to the earth conductors $z$ by means of conductors $x_1$ and $y_1$ respectively.

The arrangement according to the present invention has very substantial advantages as compared with constructions hitherto proposed. The cables serving as bus-bars can be manufactured more carefully than bus-bars which are enclosed in metal casings and are surrounded by an insulating material, with the result that the reliability of operation of the whole installation is substantially increased. Moreover, also the electric field distribution is more favourable in the case of a cable as compared with the bus-bars hitherto usual, so that installations according to the invention can be erected for a substantially higher voltage as compared with installations hitherto employed. A further advantage consists in this that assembling is considerably facilitated since in the case of cable sections which are bent to U-shape, it is not so very important to keep exactly to a definite length of cable section. Further, the cable sections serving as bus-bars may be kept in stock as spare parts, so that in the case of any damage to the bus-bar parts the damaged piece can be exchanged in a simple and ready manner. Moreover, there is a great economy in oil or compound. The main advantage, however, lies in the substantially lower expenditure which is incurred in an installation according to the invention as compared with installations as hitherto carried out.

Having now described my invention, what I claim as new and desire to secure by Letters Patent is:—

1. A metal enclosed switchgear installation comprising a number of switch units, a number of bus-bars consisting of cable sections insulated for the full voltage for effecting a connection from one switch unit to the next one and end joints for closing up each bus-bar in each switch unit, the said end joints consisting of double cable end joints respectively accommodating the beginning of one cable section and the end of the next cable section, each cable section leading from a lower connection of the one double cable end joint to an upper connection of the corresponding double cable end joint of the next switch unit.

2. A metal enclosed switchgear installation comprising a number of switch units, a number of bus-bars consisting of cable sections insulated for the full voltage for effecting a connection from one switch unit to the next one, end joints for closing up each bus-bar in each switch unit, the said end joints consisting of double cable end joints respectively accommodating the beginning of one cable section and the end of the next cable section, and inclined connecting pipes for the individual cable sections.

3. A metal enclosed switchgear installation comprising a number of switch units, a number of bus-bars consisting of cable sections insulated for the full voltage for effecting a connection from one switch unit to the next one and end joints for closing up each bus-bar in each switch unit, the said end joints consisting of double cable end joints respectively accommodating the beginning of one cable section and the end of the next cable section, double cable end joints being provided also for the end switch units and closing caps being employed for closing up one of the connections of the latter double cable end joints.

4. A metal enclosed switch gear installation comprising a number of switch units and a number of bus-bars consisting of cable sections insulated for the full voltage for effecting a connection from one switch unit to the next one, a separate pressure pipe being used with each cable section to place the insulation of the cable sections under pressure.

5. A metal enclosed switchgear installation comprising a number of switch units, a number of bus-bars consisting of cable sections insulated for the full voltage for effecting a connection from one switch unit to the next one, end joints for closing up each bus-bar in each switch unit, each of the said cable sections having a metal sheathing which is insulated at the ends of the cable section with respect to the said joints and an earth conductor being connected to the middle of the said metal sheathing.

6. A metal enclosed switchgear installation comprising a number of switch units, a number of bus-bars consisting of cable sections insulated for the full voltage for effecting a connection from one switch unit to the next one, end joints for closing up each bus-bar in each switch unit, each of the said cable sections having an armouring which is insulated at the ends of the cable section with respect to the said joints and an earth conductor being connected to the middle of the said armouring.

7. A metal enclosed switchgear installation comprising a number of switch units, a number of bus-bars consisting of cable sections insulated for the full-voltage, for effecting a connection from one switch unit to the next one, end joints for closing each bus-bar in each switch unit, power circuit breakers and casings combined with the end joints, and means for isolating the power circuit breakers, contained in the casings.

8. A metal enclosed switchgear installation comprising a number of switch units, a number of bus-bars consisting of cable sections insulated for the full-voltage, for effecting a connection from one switch unit to the next one, end joints for closing each bus bar in each switch unit, power circuit breakers and casings combined with the end joints, plug contacts contained in the casings, and contacts provided on the power circuit breakers connected with the plug contacts.

9. A metal enclosed switchgear installation comprising a number of switch units, a number of bus-bars consisting of cable sections insulated for the full-voltage, for effecting a connection from one switch unit to the next one, end joints for closing each bus-bar in each switch unit, power circuit breakers and casings combined with the end joints, means for isolating the power circuit breakers, contained in the casings, each casing receiving the beginning of one cable section and the end of the next cable section, and clips for connecting together the conductors of the cables in each cable end joint, the clips being conductively connected with the means for isolating the power circuit breakers.

10. A metal enclosed switchgear installation comprising a number of switch units, a number of bus-bars consisting of cable sections insulated for the full-voltage, for effecting a connection from one switch unit to the next one, end joints for closing each bus-bar in each switch unit, power circuit breakers and casings combined with the end joints, plug contacts contained in the casings, for isolating the power circuit breakers, each casing receiving the beginning of one cable section and the end of the next cable section and clips for connecting together the conductors of the cables in each cable end joint, the clips being conductively connected with the plug contacts.

FRANZ WÖLFER.